United States Patent
Lehman

(10) Patent No.: US 11,568,677 B2
(45) Date of Patent: Jan. 31, 2023

(54) APPARATUS, SYSTEM, AND METHOD OF PROVIDING AN AUGMENTED REALITY VISUAL SEARCH

(71) Applicant: Josh Lehman, Las Vegas, NV (US)

(72) Inventor: Josh Lehman, Las Vegas, NV (US)

(*) Notice: Subject to any disclaimer, the term of this patent is extended or adjusted under 35 U.S.C. 154(b) by 156 days.

(21) Appl. No.: 16/924,309

(22) Filed: Jul. 9, 2020

(65) Prior Publication Data

US 2021/0064852 A1 Mar. 4, 2021

Related U.S. Application Data

(60) Provisional application No. 62/871,998, filed on Jul. 9, 2019.

(51) Int. Cl.
*G06V 20/20* (2022.01)
*G06V 40/16* (2022.01)
*G06T 19/00* (2011.01)
*G06N 20/00* (2019.01)

(52) U.S. Cl.
CPC ......... *G06V 40/172* (2022.01); *G06N 20/00* (2019.01); *G06T 19/006* (2013.01); *G06V 20/20* (2022.01)

(58) Field of Classification Search
CPC .... G06N 20/00; G06N 3/0454; G06T 19/006; G06V 20/20; G06V 10/30
See application file for complete search history.

(56) References Cited

U.S. PATENT DOCUMENTS

| | | | | |
|---|---|---|---|---|
| 7,536,713 | B1* | 5/2009 | Bartholomew | G06F 16/40 380/231 |
| 10,430,212 | B1* | 10/2019 | Bekmambetov | G06F 16/958 |
| 2012/0150834 | A1* | 6/2012 | Choi | H04N 21/84 707/706 |
| 2016/0086137 | A1* | 3/2016 | Ackerman | G06Q 10/1095 705/7.19 |
| 2018/0260417 | A1* | 9/2018 | Mahadevan | G06F 16/9537 |
| 2019/0041961 | A1* | 2/2019 | Desai | G06N 3/08 |
| 2019/0289327 | A1* | 9/2019 | Lin | H04N 19/96 |
| 2020/0036528 | A1* | 1/2020 | Ortiz | H04L 63/0861 |
| 2020/0069181 | A1* | 3/2020 | Sampson | G06T 19/006 |

* cited by examiner

*Primary Examiner* — Sam Bhattacharya
(74) *Attorney, Agent, or Firm* — Thomas J. McWilliams; Barnes & Thornburg LLP

(57) ABSTRACT

An apparatus, system and method for providing a visual search using augmented reality glasses. The apparatus, system and method include a network communicatively associated with the glasses capable of providing remote connectivity to an application programming interface (API); a machine learning (ML) model communicative with the API and having an input capable of receiving live video data indicative of a view field of the glasses, wherein the ML model includes at least a data comparator and platform-specific coding corresponded to the glasses; a search engine within the ML model and having a secondary input interfaced to a comparative database, wherein the search engine compares the live view field video data to the secondary input using the comparator; and a match output capable of outputting a match obtained by the search engine over the network to the glasses.

10 Claims, 15 Drawing Sheets

APPARATUS, SYSTEM, AND METHOD OF PROVIDING AN AUGMENTED REALITY VISUAL SEARCH

CROSS-REFERENCE TO RELATED APPLICATIONS

This application claims priority to U.S. Provisional Application Ser. No. 62/871,998, entitled APPARATUS, SYSTEM, AND METHOD OF PROVIDING AN AUGMENTED REALITY VISUAL SEARCH and filed on Jul. 9, 2019.

BACKGROUND

Field of the Disclosure

The disclosure relates generally to object and facial recognition, and, more particularly, to an apparatus, system, and method of providing an augmented reality visual search.

Background of the Disclosure

One of the most widely used solutions to provide object and facial recognition systems (FRS) is the implementation of feature extraction methods based on Convolutional Neural Networks (CNN). An additional solution has historically employed Multi-task Cascaded Convolutional Networks (MTCCN) for the detection of key markers, such as in the face.

Because object and facial recognition algorithms are typically based on machine learning (ML), of utmost importance to developing a FRS is the corresponding ML model generated during training. Benchmarkings typically vary the conditions of an acquired image to which the stored dataset images are compared by a ML model. Such acquisition conditions for images may include, for example: varying lighting conditions; varying poses/angles (i.e., the degree to which a face is rotated); and varying expressions (i.e., different emotions can impact facial landmarks).

Further, alternative, or virtual, reality technologies have been one of the fastest developing entertainment technologies of the last decade. However, notwithstanding the substantial developments made in this arena, the technology still is very lacking in numerous respects, including the ability to use the glasses to search for recognizable objects or persons within the wearer's field of view.

Therefore, the need exists for an improved apparatus, system and method of providing an augmented reality visual search.

SUMMARY

The embodiments are and include an apparatus, system and method for providing a visual search using augmented reality glasses. The apparatus, system and method include a network communicatively associated with the glasses capable of providing remote connectivity to an application programming interface (API); a machine learning (ML) model communicative with the API and having an input capable of receiving live video data indicative of a view field of the glasses, wherein the ML model includes at least a data comparator and platform-specific coding corresponded to the glasses; a search engine within the ML model and having a secondary input interfaced to a comparative database, wherein the search engine compares the live view field video data to the secondary input using the comparator; and a match output capable of outputting a match obtained by the search engine over the network to the glasses.

Therefore, the embodiments provide an improved apparatus, system and method of providing an augmented reality visual search.

BRIEF DESCRIPTION OF THE DRAWINGS

The disclosure is illustrated by way of example and not limitation in the accompanying drawings, in which like references may indicate similar elements, and in which.

DETAILED DESCRIPTION

Figure 1:
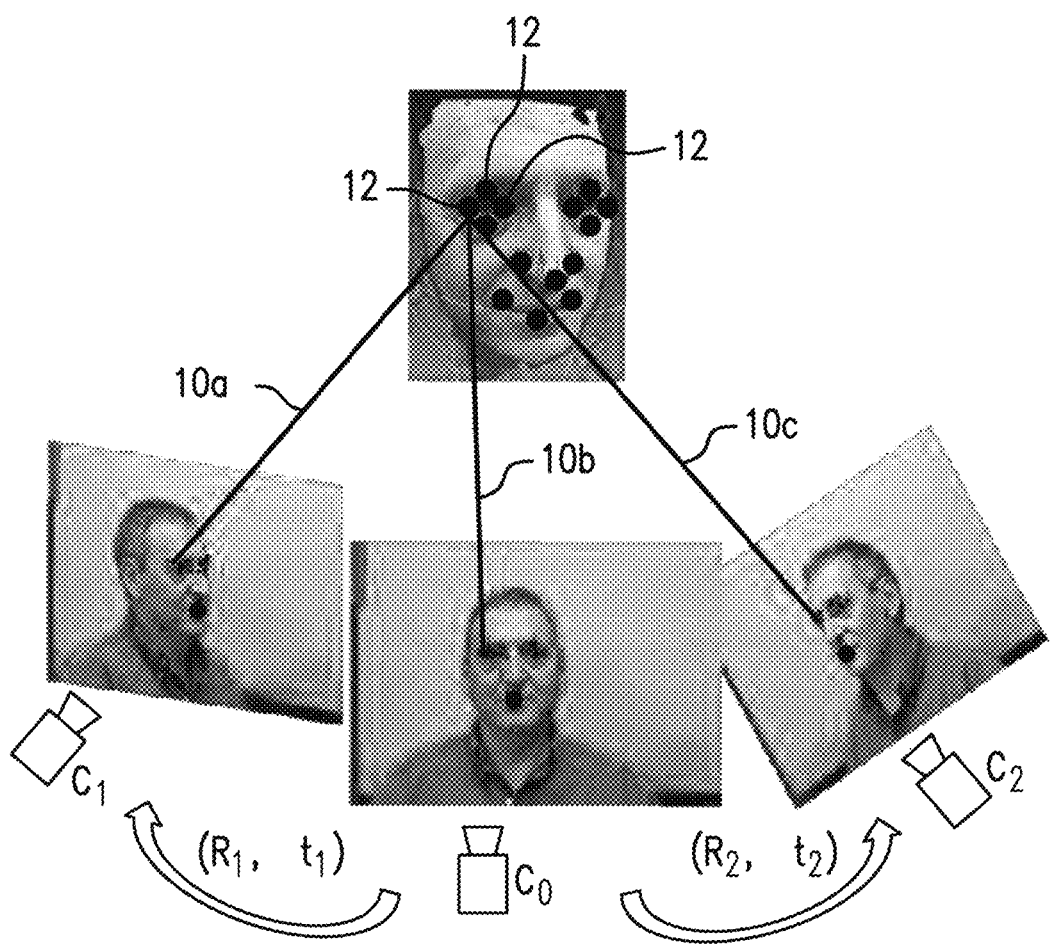
FIG. 1 is an illustration of an aspect of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform, transceive and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Thereby, the embodiments enable collecting, comparing and processing images searched based on appearance within a view field of augmented reality glasses. More specifically, the disclosed solution may provide control as to how the images are enrolled and compared, resulting in better search and matching results. Parameters may be adjusted to yield exceptional results.

There are two kinds of mistakes that can be made during a visual view field appearance comparison: False Acceptance [FA], in which two different faces or objects are accepted as the same; or a False Rejection [FR], in which two faces or objects are actually the same, but are rejected as a mismatch. A score within a given threshold determines whether a match is valid, in an attempt to avoid either FR or FA. A FRS is thus characterized by a receiver operating characteristic curve [ROC curve], on which both the FAR (false acceptance rate) and FRR (false rejection rate) are plotted.

Moreover, one may compute the accuracy of a FRS in the following way: accuracy=(TP+TN)/(TP+TN+FP+FN), where TP is true positive, TN is true negative, and FP, FN are false positive and false negative, respectively. However, accuracy is not a strong metric for a recognition system, since generally interest lies in controlling some of the parameters (FAR, i.e., FP; or FRR, i.e., FN). It should be noted that it is typically more important to minimize the FAR than the FRR.

It should also be noted that errors in identification increase with database size. Thus, the focus of the disclosure is ML model verification, and not identification as, if identification is analyzed, the FAR would have to be scaled along with the size of the comparative database.

The disclosed ML model comprises those qualities that make it difficult to detect a face or object, or which increase the number of misidentified features, which leads to FA and FR (hereinafter "confusion factors" 115). For example, aging from the comparative image presents an important factor affecting the identification of facial landmarks; likewise, similarities in features, color tones, or shadowing may present misidentification difficulties. Other factors, such as environmental factors, such as lighting, can also hinder a model's ability to extract features or landmarks.

By way of example, FaceNet is an open-source implementation of the face recognizer described in the paper "FaceNet: A Unified Embedding for Face Recognition and Clustering". The FaceNet project also uses ideas from the paper "Deep Face Recognition" from the Visual Geometry Group at Oxford. Using model verification (as opposed to identification) for the reasons discussed above, it appears that the VGG application of FaceNet yields high quality ML model accuracy results when applied to LFW. As such, one model employed in the embodiments disclosed herein may be based upon a VGG application of FaceNet, as modified as discussed throughout.

The disclosed ML model may initially add substantial image options, such as flipped images, to increase the data sample such as to allow for application of 2D and 3D analyses, as discussed further below. Application of these multiple analyses also helps alleviate FR and FA due to the confusion factors 115. The foregoing 2D and 3D "multi-analysis", in conjunction with a mean subtraction calculation, and with the usage of fixed image standardization, enables a 97.9% TAR (true acceptance rate) for a FAR (false acceptance rate) of 0.001, i.e., 1 in 1,000 identifications.

Yet further, in training 119 the disclosed ML model 110, considerations are made as to forming the training set, the size of the final vectors, the metric used to compare the results, and the loss function. Moreover, biometrics fusion, also known as "Multi-Biometrics", wherein a number of biometrical information is combined to improve the results over that which a system obtains when using just one biometrical trait, may be employed. For example, the disclosed ML model approach may be based on several different images per individual.

Testing of the ML model may include analyzing identification, using a 1 to N comparison based in the same model demonstrating the improved verification referenced above. More particularly, the FPR (people not in the database identified as being in it) is N×FPR, where N is the number of persons in the DB and FPR is the False Positive Rate. For example, using a FaceNet base model as referenced above (FPR@0.1% produce a TPR of ~98.6%), FPR=N×0.001—meaning, if the database size is 1000, there should be one false identification.

One of the most important issues, i.e., confusion factors, that affects the identification accuracy of 2D recognition systems is the change in the pose/position of a person or object (C0), (R1, t1), (R2, t2) with respect to the camera (C0, C1, C2). However, one of the biggest differences between 2D and 3D recognition is the need for substantial additional data acquisition processes and devices, preferably without a significant increase in processing time.

In particular, 3D acquisition may require specialized hardware. 3D data acquisition methods may be active or passive. Moreover, 3D face data acquisition may be keyed in the embodiments to particular, detectable features, such as facial features, which may serve as the base points for the 3D analysis of the comparison dataset 121 when applied to the acquired real time data. This is illustrated with particularity in FIG. 1.

Figure 2:
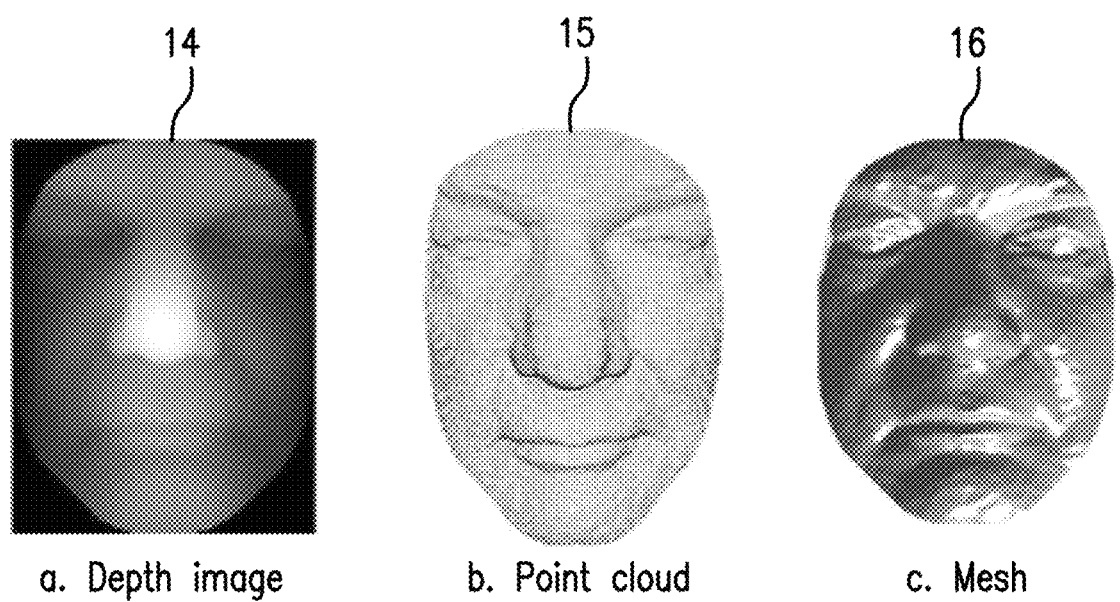
FIG. 2 is an illustration of aspects of the embodiments.

More specifically, 3D data may be processed as different data representations based on the base points as assessed in a given representation type. By way of example, the processed facial data may be interpreted in one or more of three unique formats, as illustrated in FIG. 2: i.e., as a depth image 14, a point cloud 15, or a mesh 16.

Acquisition of the data for this 3D comparison may occur via a dedicated 3D scan device used for enrollment to provide data for later identification. For example, an iPhone X lock screen may use enrollment data for each login using structured light to generate a 3D shape. However, most cases may not have a 3D enrollment image to compare or query against. Therefore, the disclosed model may use techniques to compare a 3D face to a 2D image, or a 2D face to a 3D image, and/or to engage in the multi-analysis discussed herein.

In short, data acquisition (also referred to as enrollment if done by agreement with a subject), either for the comparative/enrollment data, or for the identification data, may indicate to hardware that several snapshots (C0), (C1), (C2) that represent the individual or object from different angles are to be performed from different angles. This can allow either an overlay of the snapshots to form a 3D comparative image, or can result in selection of a given 2D image in the variety of captures for a comparison (such as using a pose/position-estimation algorithm applied to each of the 2D images). In either case, the key base points 12 referenced above may serve as comparison points 10a, 10b, 10c for switching between 2D and 3D.

In each such case, the best angle may be used to compare a pair of images (C0, C1), (C2), and the comparison may be defaulted to 2D methods, such as to limit processing power needed. That is, 3D comparison/enrollment data and/or 3D identification capture data may be devolved into 2D data.

Pose/position estimation may be solved using a variety of solutions known in the art, integrated with the ML model disclosed herein. For example, Perspective-n-Point (PnP) uses a set of 3D points in the world 12 and their corresponding 2D key base image points 10a, 10b, 10c in the image to estimate a pose/position.

More generally, in order to estimate the pose of a face in a camera, a generic 3D model may be used. A proposed model employed in the disclosed ML/Multi-analysis model is based on six facial landmarks, with the tip of the nose as the center:
1. Tip of the nose: (0.0, 0.0, 0.0)
2. Chin: (0.0, −330.0, −65.0)
3. Left corner of the left eye: (−225.0, 170.0, −135.0)
4. Right corner of the right eye: (225.0, 170.0, −135.0)
5. Left corner of the mouth: (−150.0, −150.0, −125.0)
6. Right corner of the mouth: (150.0, −150.0, −125.0)

A model may be further refined by multiplying each dimension with a coefficient. Further, the camera or object pose is defined by 6-DoF (degrees of freedom)—namely 3 rotation angles and 3 translation coordinates.

Moreover, the foregoing algorithm may be employed iteratively. That is, an initialization point may be given; and thereafter, each live pose/position estimation may be iteratively performed using the immediately previous frame pose/position values. This additionally helps to avoid noisy estimations of data values. Consequently, for every frame in the model, key landmarks are detected in the image and this data, in conjunction with the previous frame's pose/position value, are used to estimate the pose/position.

Figure 3:
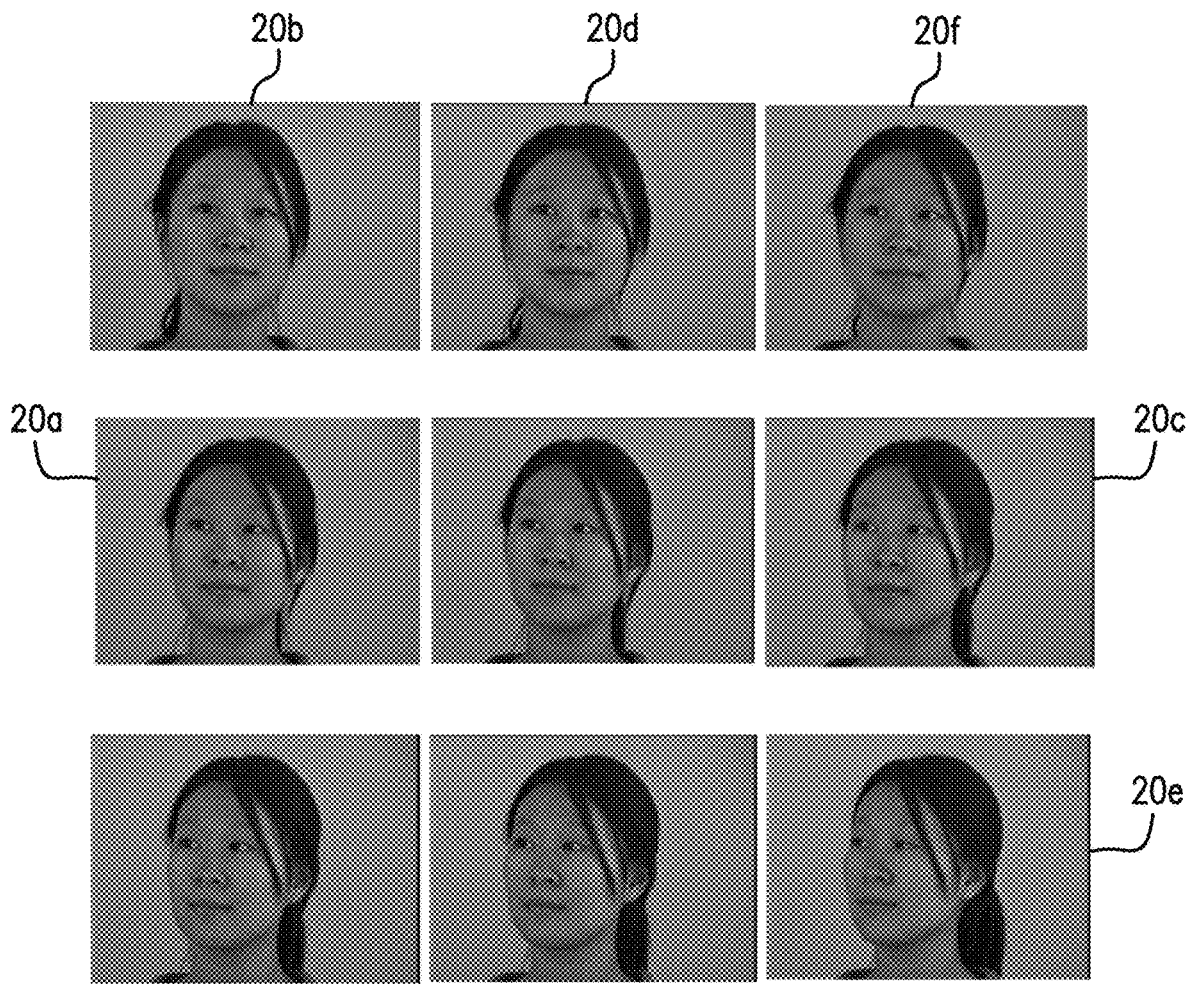
FIG. 3 is an illustration of an aspect of the embodiments.

A pose/position model may be evaluated using an annotated dataset of images with the corresponding yaw angle included 20a, 20b, 20c, 20d, 20e, 20f. Alternatively, yaw, pitch and roll angles may be monitored. Variations in a 2D image assessed in a pose/position model 20a, 20b, 20c, 20d, 20e, 20f, such as by using the face key point analysis referenced above in FIG. 1, is illustrated in FIG. 3.

Figure 4:
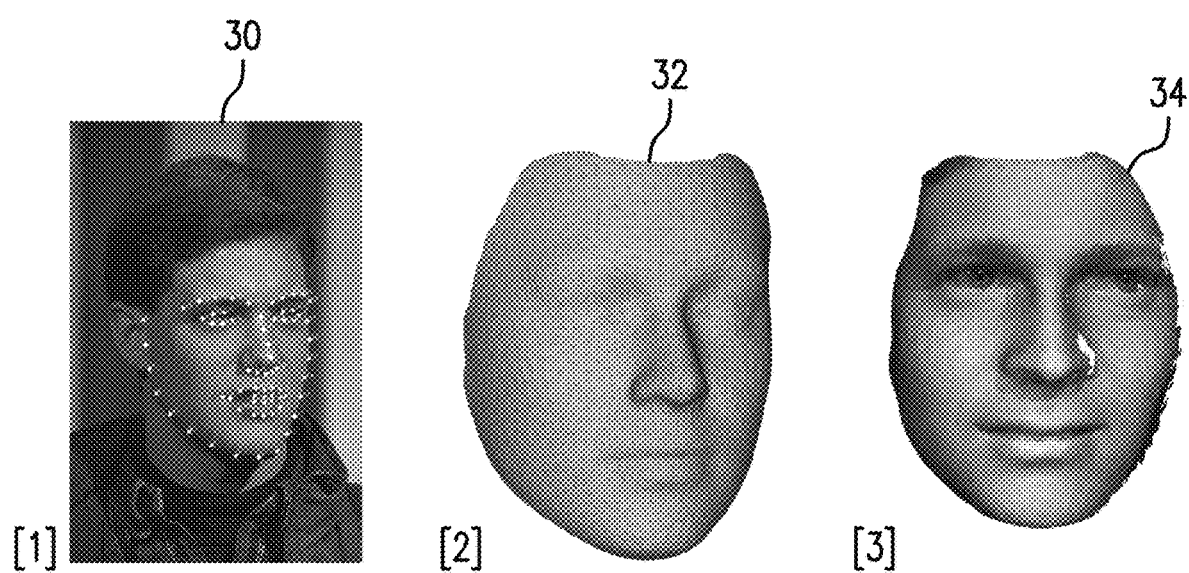
FIG. 4 is an illustration of an aspect of the embodiments.

Algorithmically, the embodiments may generate a 3D model from a set of 2D images, even in circumstances where those 2D images are obtained from a video sequence. The system maps points on the 2D picture with points on a 3D shape model using the following steps: detecting a set of points on the 2D image 30; mapping key points in the image with points on a 3D mesh 32; and receiving the result of the obtained 3D mapping and mapping the 3D mesh to it 34. This is illustrated in relation to FIG. 4.

An enrolled identity, with its correspondent embeddings, represents an individual person or object and can thus be used as either a search parameter or included in a set of identities as an identity being searched for. The embodiments may include a camera rig to enroll the data, which ensure quality data sets and which provide a standardization of identities, as discussed further below.

The embodiments additionally enable performance of different visual search tasks 112, using the disclosed ML model 110, within the augmented reality environment provided by A/R glasses 102. Visual search tasks 108 may include, but are not limited to, both facial recognition and object classification.

Figure 5:
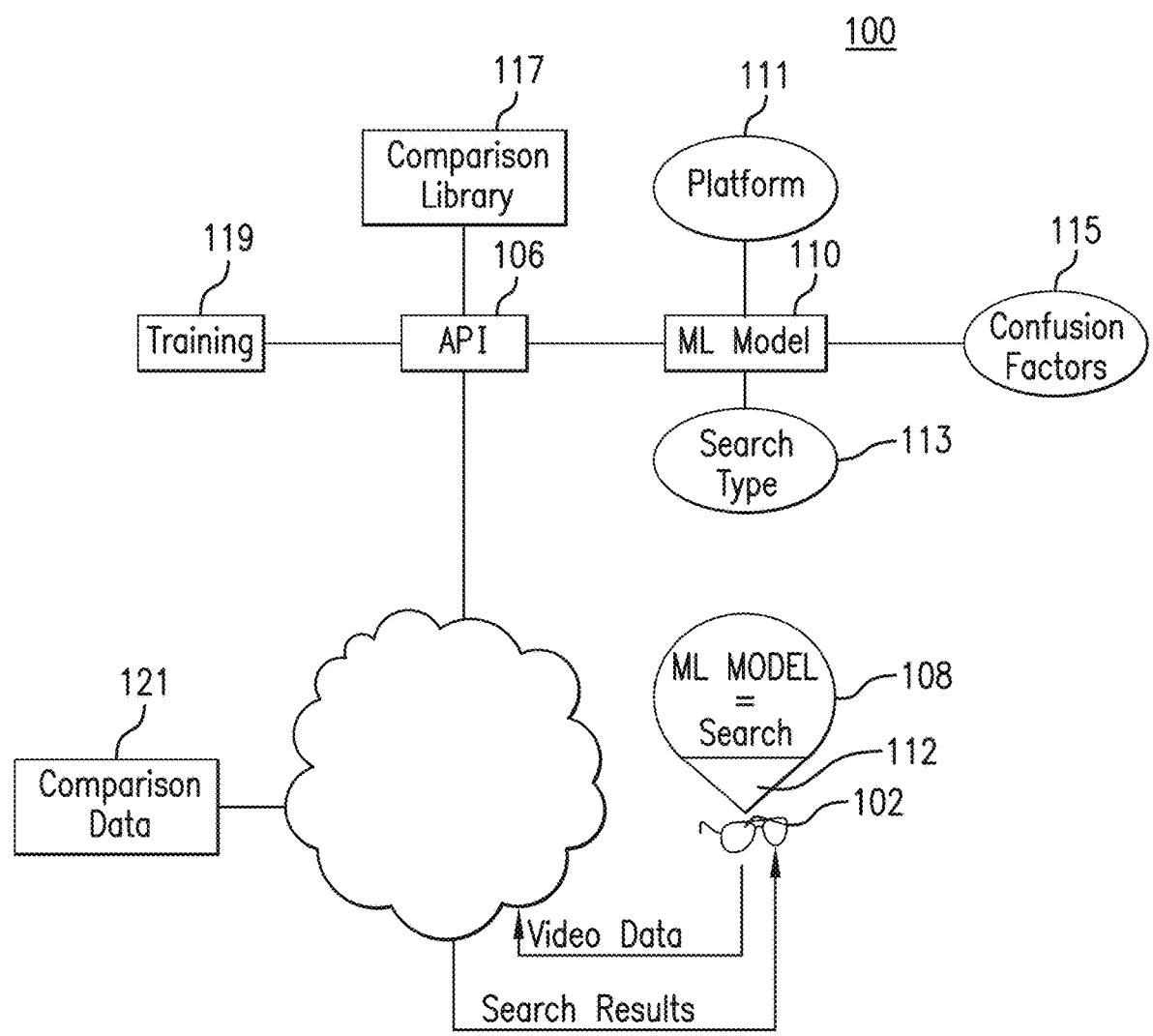
FIG. 5 is an illustration of an aspect of the embodiments.

More specifically, FIG. 5 illustrates a system employing augmented reality glasses communicatively associated, via an at least partially thin client connection, with a remote, such as a cloud-based, API 109 that allows execution of one or more visual searches via a ML model 110 using the view field of the glasses.

The cloud API may integrate one or more of the disclosed ML model algorithms. The ML algorithms may include variable aspects related to the type of AR glasses hardware 102 that is to execute the search, and/or may include aspects that are platform 111 specific, by way of example.

The live video feed from the glasses may be provided to the cloud API in an unprocessed manner, or in a processed stream to minimize processing and/or bandwidth. For example, the feed may comprise a plurality of single frames (i.e., still images) from the user's environment which are sent into the cloud for remote processing.

The API may then receive an image from the glasses, such as in a base64 encoded stream, and uses that received image to generate a prediction result. Once the image is processed through the visual search API, that prediction result is sent back to the glasses, and the result prediction presented to the user in AR.

In order to effectively classify images being passed to the API 109, a visual search library 117 corresponded to a ML model 110, such as may be created using a proprietary actual or training data set 119, may be compared to the received images by the ML model. Matches obtained by the comparison indicate identified objects (or faces) in a particular image.

By way of specific example, images may be sent from a set of AR glasses to the cloud based API with endpoints designed to handle such data. First, the API takes the image and detects any faces in the image. If any faces are detected, the API begins the process of recognition, otherwise the API will respond letting the client know that no faces were found.

The process of recognition may be split in two major processes, as discussed herein: enrollment and identification. In order to properly derive the identity of an individual, prior data regarding that individual enrolled in the library data set 117 to which the comparison is performed.

The library data set 117 may be composed of N individuals with M embeddings per individual, as a person may have numerous facial images linked to her, as discussed throughout. Once individual identities are created with corresponding embeddings, those identities 121 may be iteratively compared to each embedding derived from an image. The result of that comparison may be described as a distance between the enrolled data and the image data. The smaller the amount of distance between the two embeddings, the more similar the facial features are (i.e., if comparing the same image against itself, a distance value of 0.0 should be expected). This allows for a comparative matching between a facial image and a library identity.

As referenced above, a camera rig may provide cameras positioned in a way to allow multiple angles of video providing the enrollment process with a diverse pool of embeddings drawn from the frames of the video. Such a rig may, for example, provide for a voluntary enrollment, may form a part of the application process for government identification (i.e., government clearances, passport, driver's license, etc.), or may form part of a private identification system (i.e., an employee ID).

Figure 6A:
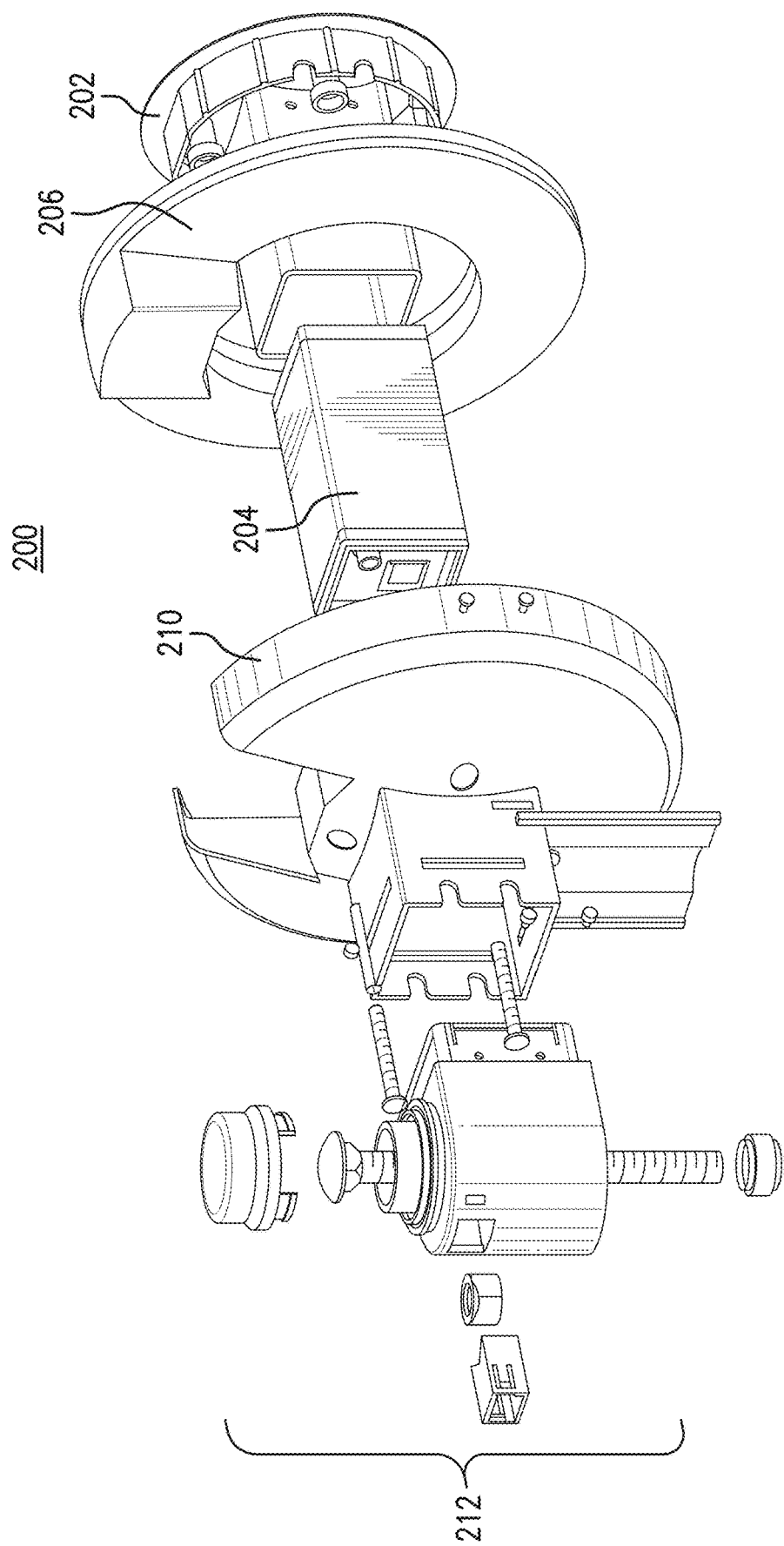
FIG. 6 illustrate aspects of the embodiments.
Figure 6B:
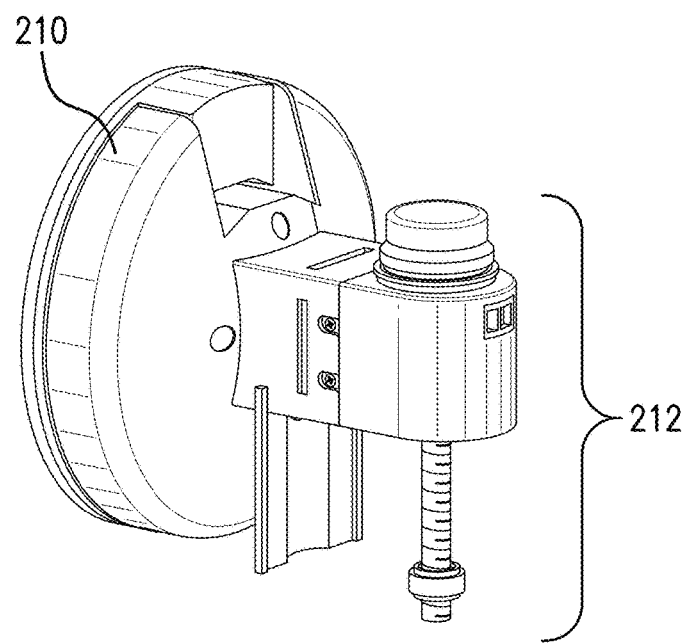
Figures 6C, 6D:
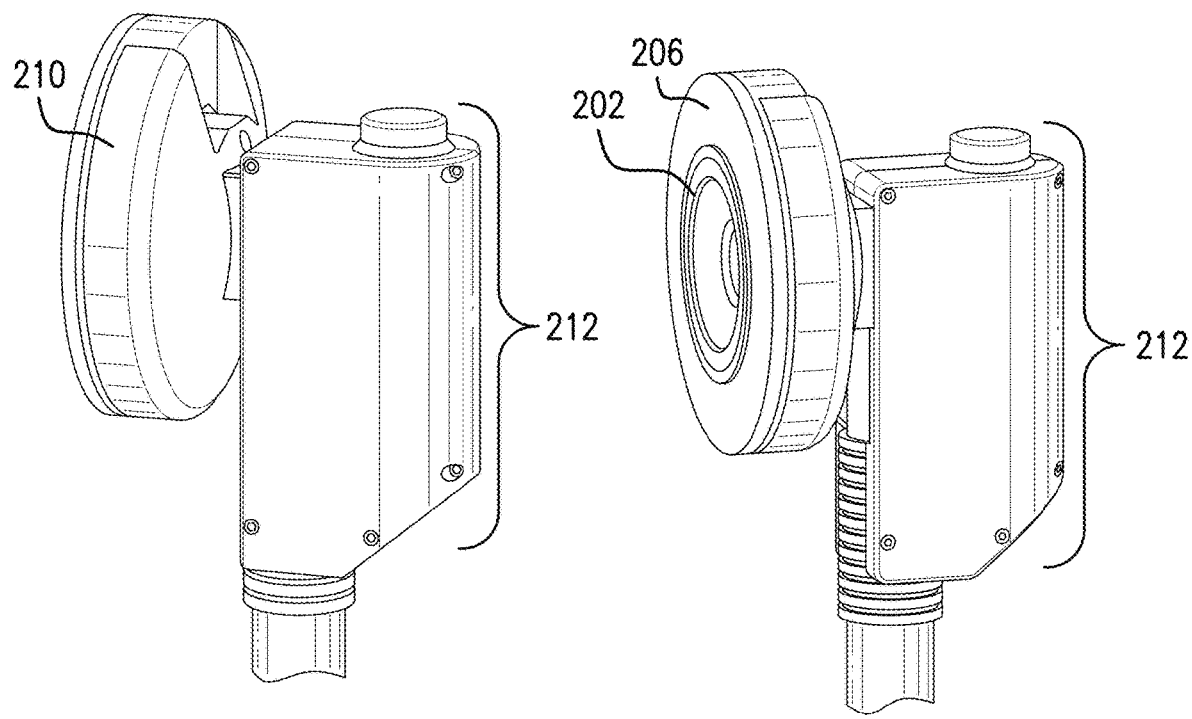

FIGS. 6A, 6B, 6C, and 6D illustrates an individual camera 200 that may be associated with the disclosed rig. Illustrated are a camera aspect 204, which may be embedded within a housing 202 that may also include lighting 206, such as LED ring lighting, an a rear camera housing 210 that physically associates with a (manually or automatically) adjustable mount 212. The adjustable mount may allow for rotational adjustment of camera angle, and a height adjustment of the camera. Also included may be power and signal lines running to at least the camera aspect, the lighting, and the adjustable mount. FIG. 6A illustrates the referenced camera in breakout view, and FIGS. 6B-6D illustrate the assembled camera assembly.

Figure 7A:
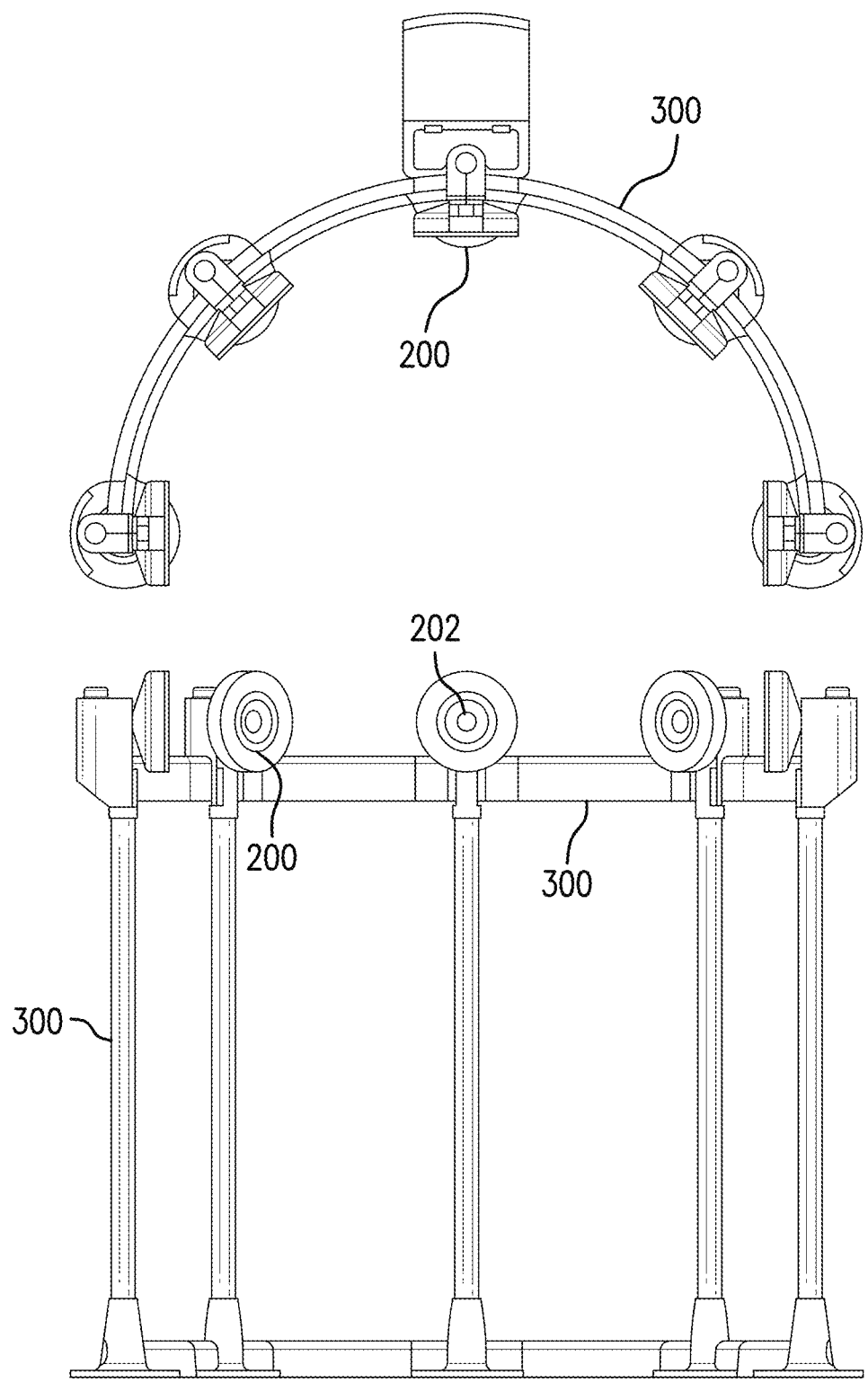
FIG. 7 illustrate aspects of the embodiments.
Figure 7B:
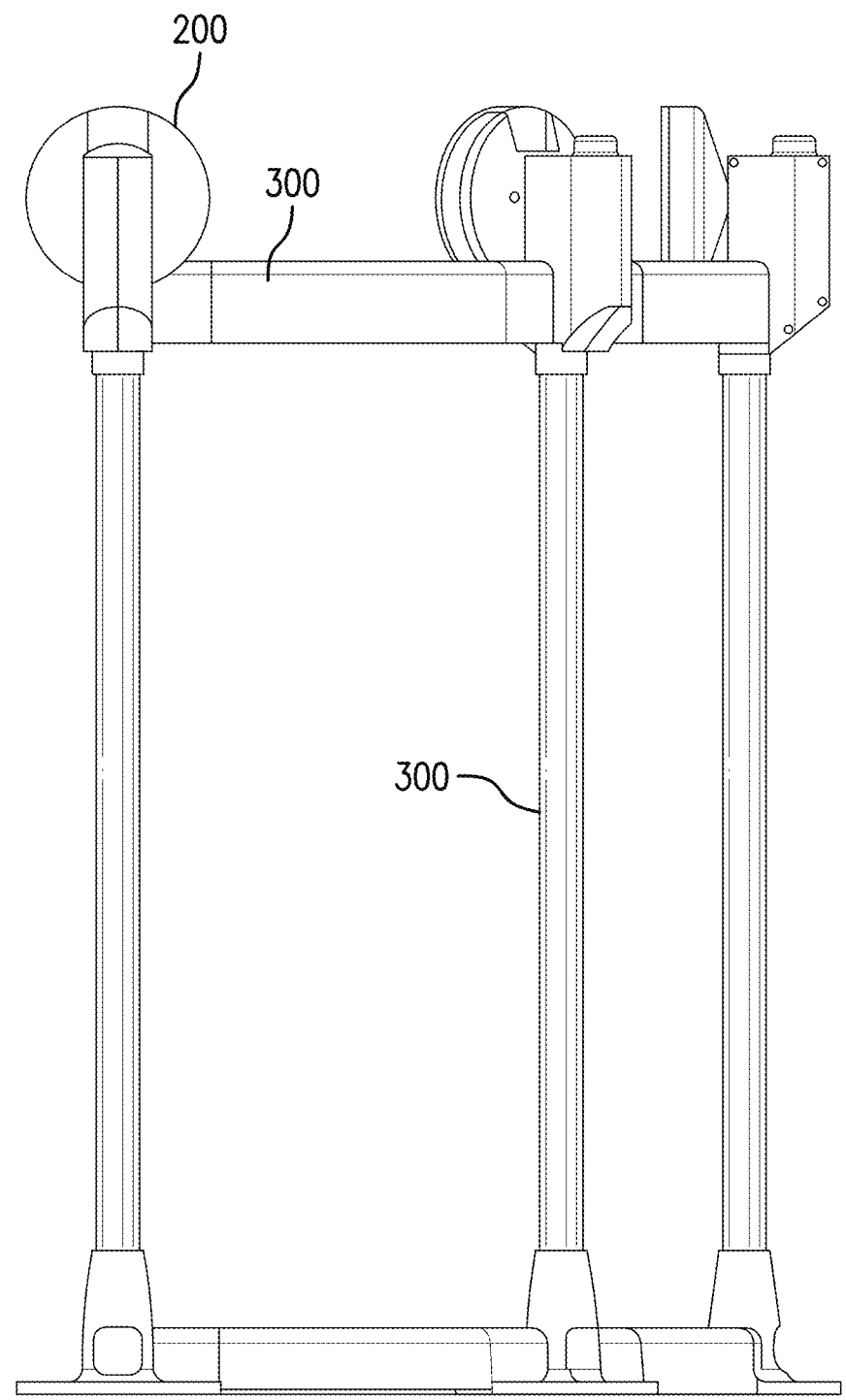
Figure 7C:
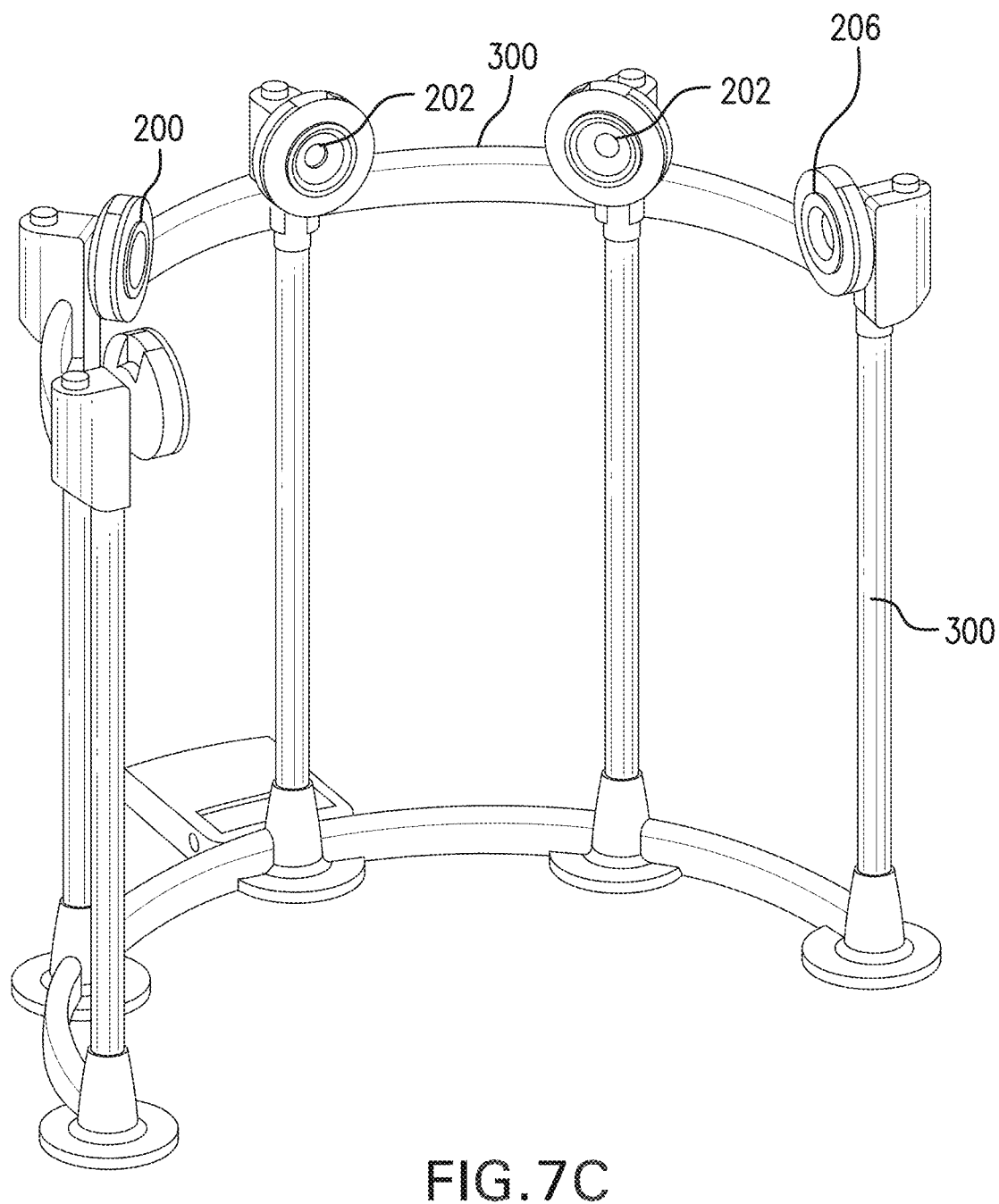

FIGS. 7A, 7B and 7C illustrate the cameras illustratively provided in FIG. 6 connectively associated with a camera rig. The camera rig 300 may provide interconnection of the individual cameras to the aforementioned camera server, UI, and/or network. The imaged subject may be placed at the approximate center point of the field of view of the cameras illustratively shown.

Figure 8A:
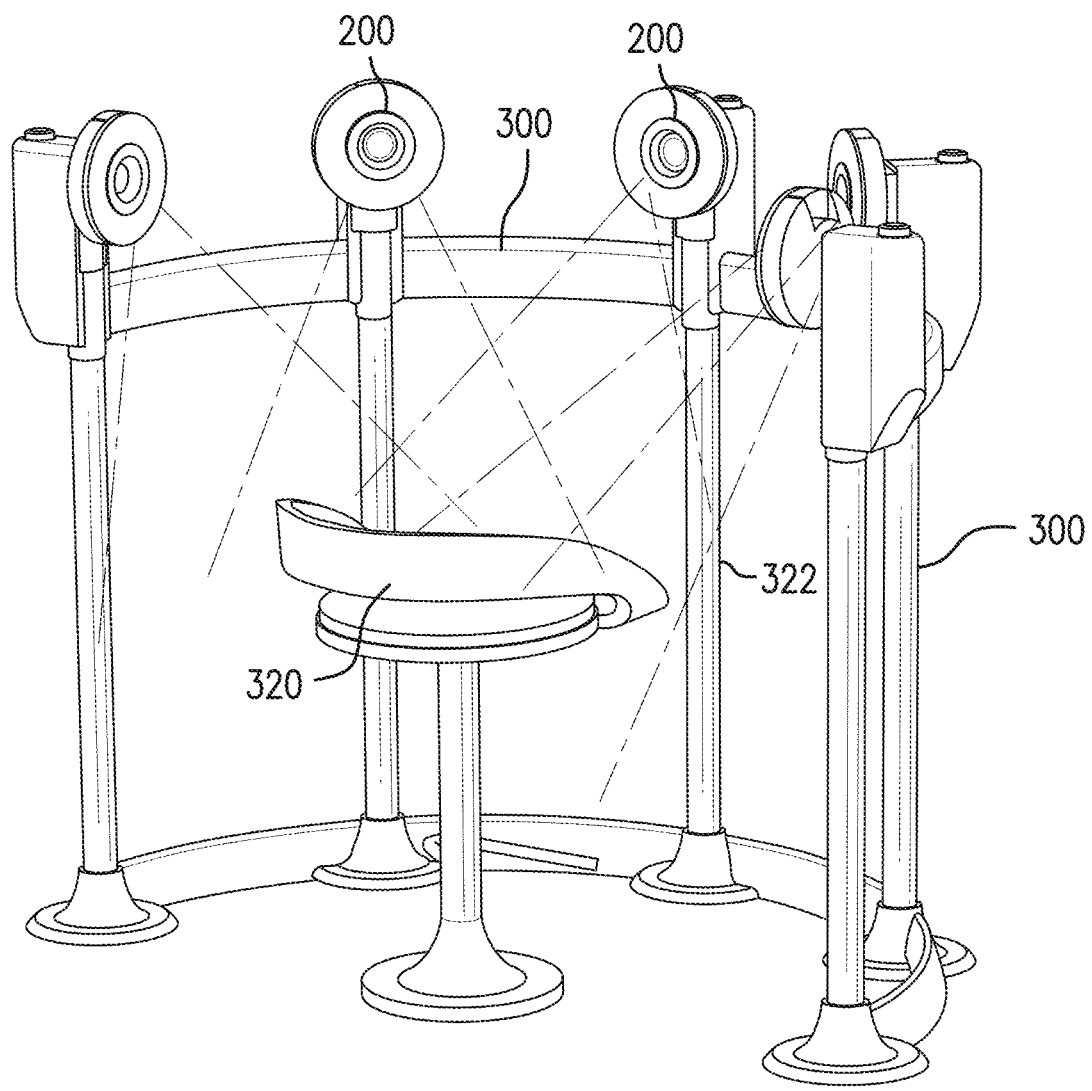
FIG. 8 illustrate aspects of the embodiments.
Figure 8B:
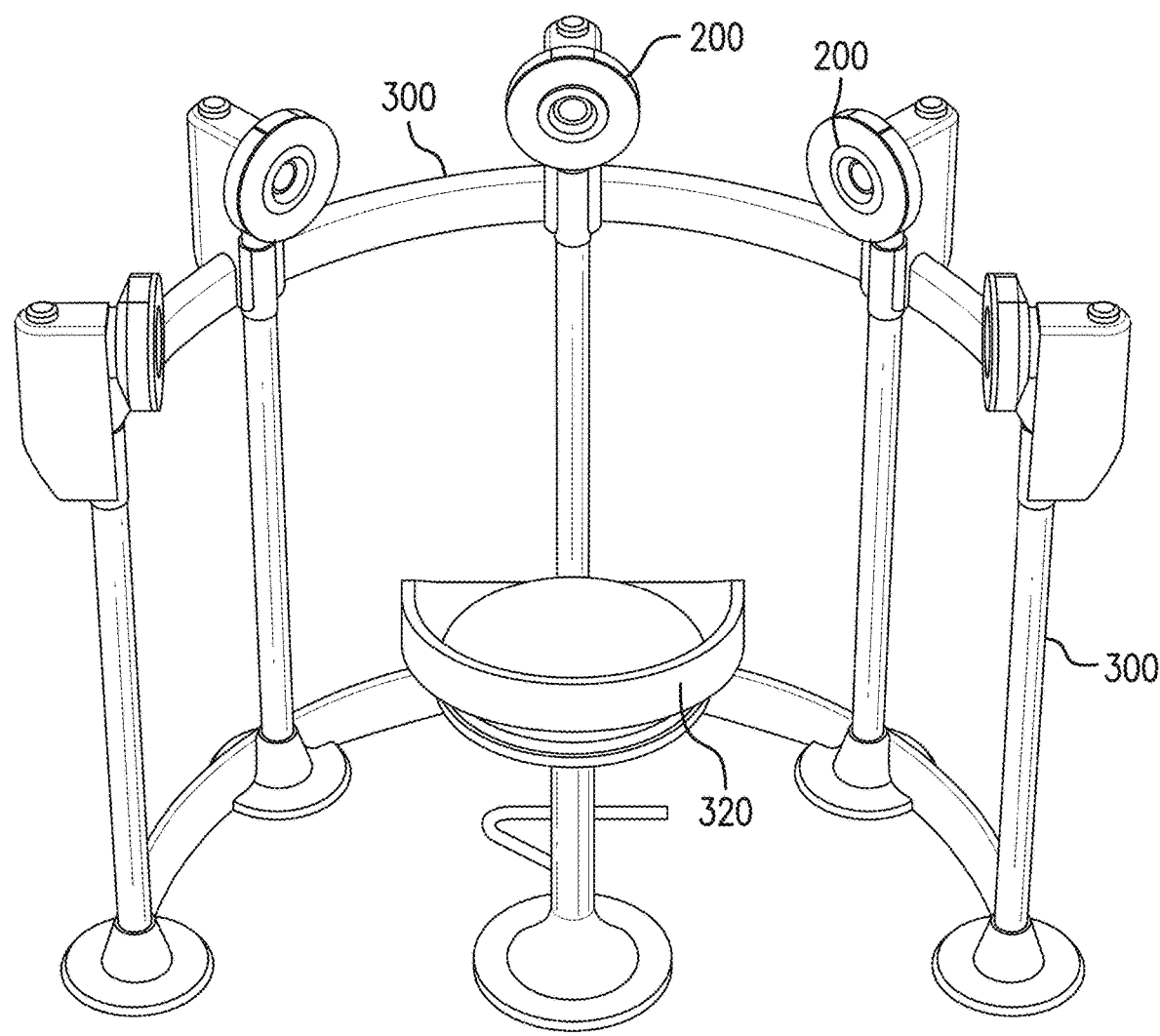
Figure 8C:
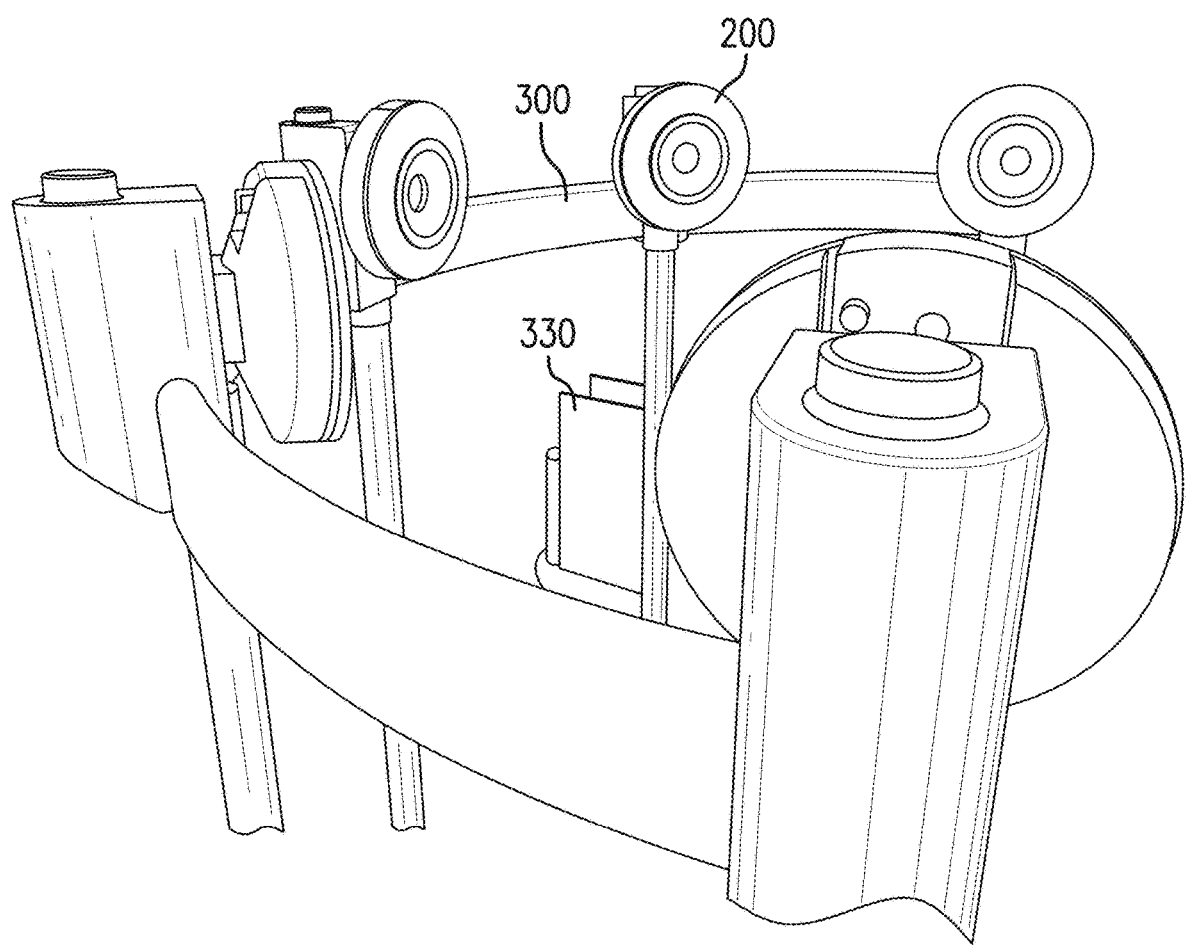

FIGS. 8A, 8B and 8C illustrate an assembled plurality of cameras atop a rig, and the image subject having a seating location 320 at the centerpoint of the combined fields of view of the plurality of cameras. Further illustrated with particularity in FIG. 8C is an association of the camera rig, and hence of the individual cameras with a camera server 330. The adjustable height 322 and lighting from the camera rig allow for maximum detail extraction and optimal lighting for different dimensioned or positioned individuals or objects.

A method of reducing the size of the identification library comparison set is through group identities, i.e., hierarchical categorization. Identities, whether enrolled or anonymous, may be assigned to groups having certain characteristics, which may allow for selective searches and/or the generation of categorical watchlists. An identity can belong to multiple or as many groups as required.

Figure 9:
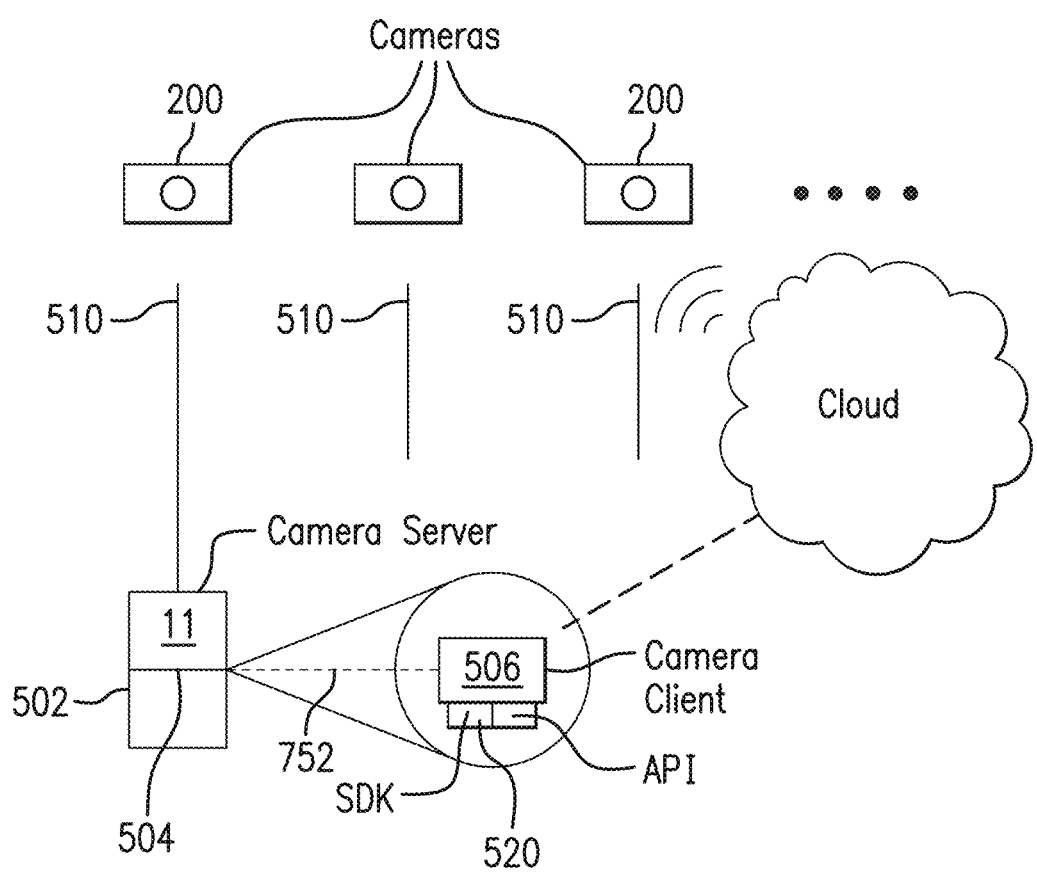
FIG. 9 illustrates aspects of the embodiments.

As referenced above and as illustrated in FIG. 9, a camera server 11 may obtain (or receive, such as from a third party feed in the cloud) comparative image data 502. As such, a software component "camera client" 506, such as a C++ component, may handle low level communication 510 with a specific camera 200 or cameras and/or data feeds, to expose a video stream 504. An SDK 520 may offer an open source framework 752 for video processing and general purpose streaming.

The server (or servers) acts as an intermediate discovery node between web clients and camera clients, allowing them to establish a real time communication for commanding cameras and obtaining a video stream. All generated data from cameras or third party streams, such as videos, log files, etc., may be available through an HTTP simple interface.

For application of a clustering algorithm, the video is run through a multithreaded video processing pipeline with each frame being processed by the disclosed FRS. The process steps may include: uploading a video to the server for processing; returning a unique identifier for the client to check elapsed time and processing time remaining; background processing to minimize FRS processing; detecting, frame by frame, all the faces/objects in the video and embedding the data, yielding a set of N embeddings with 1,024 values in each; using a scan library, separating the faces/objects into clusters, wherein each cluster may have, at a minimum, 6 matches from other frames in the video; classifying faces/objects that don't belong to a cluster as "noise values" and placing them into a separate cluster (in case the client still would like to search through these values); and placing separated clusters of faces as anonymous identities that are enrolled in the system but not corresponded to an enrolled identity.

Identification is the parallel process of matching an identity (enrolled or anonymous) to a set of N other identities. Thus, anonymous identities are handled as enrolled identities, but to keep the data sets clean of potential bad quality, the two types are separated. It should also be noted that the accuracy of the algorithm is valid until a point at which the possibility of a FA (false acceptance) is inevitable.

Specifications or filters of characteristics may be used in comparing identities against a larger set, such as enrolled identities, such as in order to minimize processing time and resources. The filters also may improve accuracy in gaining a correct match. By way of example, filters may be automatically and/or hierarchically applied, such as wherein a first filter may limit the search comparison by skin tone, hair color, eye color, facial hair, distinct facial features, etc., in order to streamline the comparison process.

However, videos being uploaded may or may not contain certain information, i.e., may be black and white instead of color, may lack sufficient background information to assess size, and so on. To address this, a collection may be created that contains multiple videos and allows for the searching of and for specific media resources, rather than narrowing a search by filter characteristics. A collection may also be searched by time, or by other aspects related to features other than the appearance of the subject(s) of the video(s).

In order to determine if an identity matches an enrolled or anonymous identity, all the embedded aspects of identities are compared against embedded aspects found in the video resource. A comparison between two embeddings yields a distance. Various formulas can be applied to distances to determine whether an identity is a match or not (e.g. mean, median, or minimum distance, for example).

A threshold acts as a minimum qualifying distance to indicate a good result. As such, thresholding also helps to clearly identify if a match is in the set N, rather than or in addition to providing a best result.

In conjunction with the distance comparison, identification may take the cluster results as a set, and attempt to assign a target identity's embedding to an anonymous identity. This predictive method can determine whether a face belongs to a particular cluster.

Figure 10:
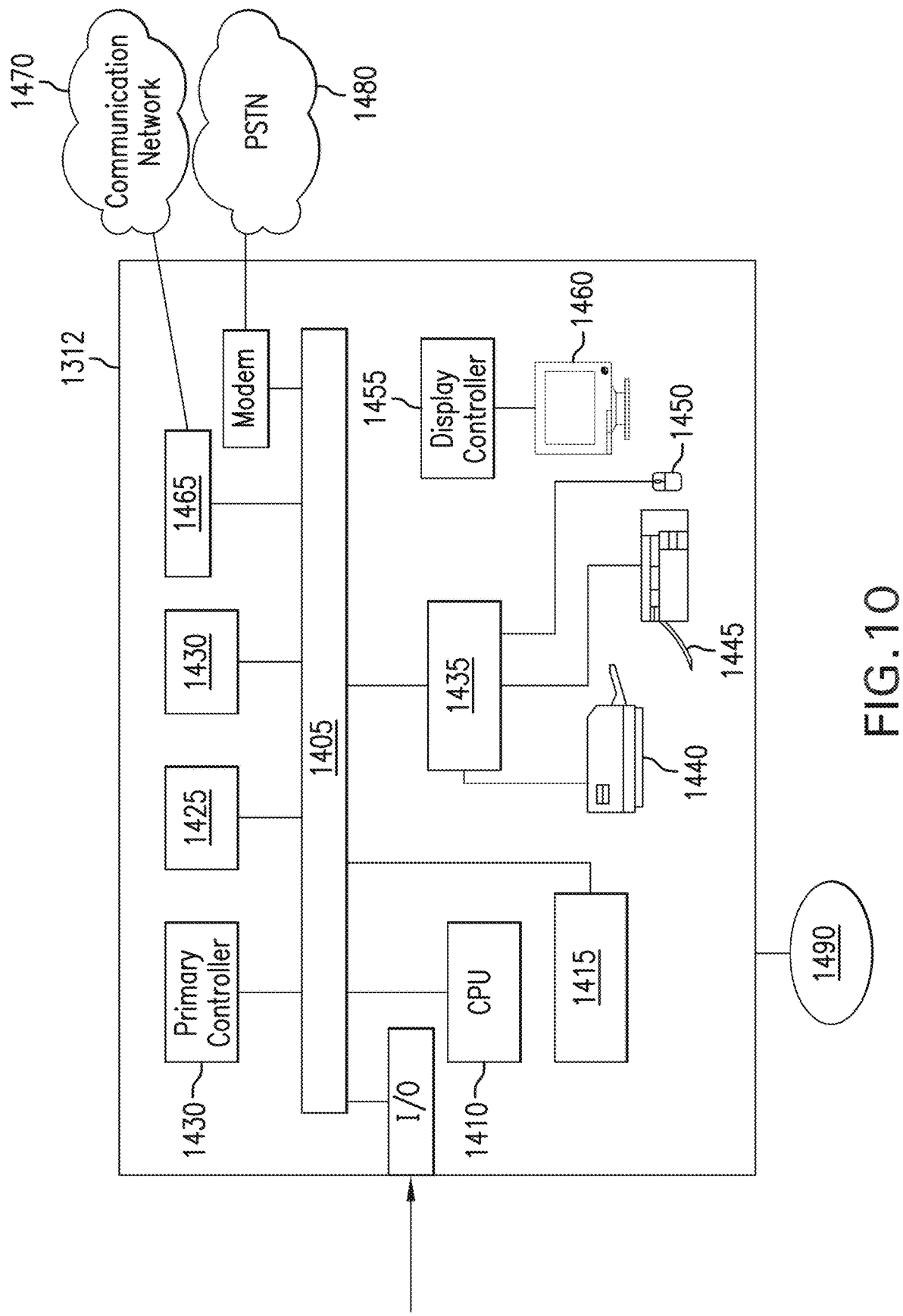
FIG. 10 illustrates aspects of the embodiments.

FIG. 10 depicts an exemplary computer processing system 1312 for use in association with the embodiments, by way of non-limiting example. Processing system 1312 is capable of executing software, such as an operating system (OS), applications, user interface, and/or one or more other computing algorithms/applications 1490, such as the recipes, models, programs and subprograms discussed herein. The operation of exemplary processing system 1312 is controlled primarily by these computer readable instructions/code 1490, such as instructions stored in a computer readable storage medium, such as hard disk drive (HDD) 1415, optical disk (not shown) such as a CD or DVD, solid state drive (not shown) such as a USB "thumb drive," or the like. Such instructions may be executed within central processing unit (CPU) 1410 to cause system 1312 to perform the disclosed operations, comparisons and calculations. In many known computer servers, workstations, personal computers, and the like, CPU 1410 is implemented in an integrated circuit called a processor.

It is appreciated that, although exemplary processing system 1312 is shown to comprise a single CPU 1410, such description is merely illustrative, as processing system 1312 may comprise a plurality of CPUs 1410. Additionally, system 1312 may exploit the resources of remote CPUs (not shown) through communications network 1470 or some other data communications means 1480, as discussed throughout.

In operation, CPU 1410 fetches, decodes, and executes instructions from a computer readable storage medium, such as HDD 1415. Such instructions may be included in software 1490. Information, such as computer instructions and other computer readable data, is transferred between components of system 1312 via the system's main data-transfer path. The main data-transfer path may use a system bus architecture 1405, although other computer architectures (not shown) can be used.

Memory devices coupled to system bus 1405 may include random access memory (RAM) 1425 and/or read only memory (ROM) 1430, by way of example. Such memories include circuitry that allows information to be stored and retrieved. ROMs 1430 generally contain stored data that cannot be modified. Data stored in RAM 1425 can be read or changed by CPU 1410 or other hardware devices. Access to RAM 1425 and/or ROM 1430 may be controlled by memory controller 1420.

In addition, processing system 1312 may contain peripheral communications controller and bus 1435, which is responsible for communicating instructions from CPU 1410 to, and/or receiving data from, peripherals, such as peripherals 1440, 1445, and 1450, which may include printers, keyboards, and/or the operator interaction elements on a mobile device as discussed herein throughout. An example of a peripheral bus is the Peripheral Component Interconnect (PCI) bus that is well known in the pertinent art.

Operator display 1460, which is controlled by display controller 1455, may be used to display visual output and/or presentation data generated by or at the request of processing system 1312, such as responsive to operation of the aforementioned computing programs/applications 1490. Such visual output may include text, graphics, animated graphics, and/or video, for example. Display 1460 may be implemented with a CRT-based video display, an LCD or LED-based display, a gas plasma-based flat-panel display, a touch-panel display, or the like. Display controller 1455 includes electronic components required to generate a video signal that is sent to display 1460.

Further, processing system 1312 may contain network adapter 1465 which may be used to couple to external communication network 1470, which may include or provide access to the Internet, an intranet, an extranet, or the like. Communications network 1470 may provide access for processing system 1312 with means of communicating and transferring software and information electronically. Additionally, communications network 1470 may provide for distributed processing, which involves several computers and the sharing of workloads or cooperative efforts in performing a task, as discussed above. Network adaptor 1465 may communicate to and from network 1470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A system for providing a visual search using augmented reality glasses, comprising:
   a network communicatively associated with the glasses capable of providing remote connectivity to an application programming interface (API);
   a machine learning (ML) model communicative with the API and having an input capable of receiving live video data indicative of a view field of the glasses, wherein the ML model includes at least a data comparator and platform-specific coding corresponded to the glasses;
   a search engine within the ML model and having a secondary input interfaced to a comparative dataset of multiple points on a plurality of stored faces, wherein the search engine compares the live video data to the secondary input using the comparator; and
   a match output capable of outputting an identity match obtained by the search engine over the network to the glasses.

2. The system of claim 1, wherein the live video data is unprocessed at the input.

3. The system of claim 1, wherein the live video data is pre-processed at the input.

4. The system of claim 3, wherein the pre-processing comprises at least a minimization of bandwidth consumption.

5. The system of claim 1, wherein the live video data comprises a plurality of single frames.

6. The system of claim 1, wherein the live video data comprises a base64 encoded stream.

7. The system of claim 1, wherein the match comprises an object in the view field.

8. The system of claim 1, wherein the match comprises a face in the view field.

9. The system of claim 1, wherein the comparative database comprises a plurality of enrolled data points.

10. The system of claim 9, wherein the enrolled data points comprise a plurality of embeddings correspondent to unique aspects of an object or a face.

* * * * *